April 26, 1966  W. G. ERICKSON  3,247,911
ROTATING CULTIVATOR SHIELD
Filed April 27, 1964  2 Sheets-Sheet 1
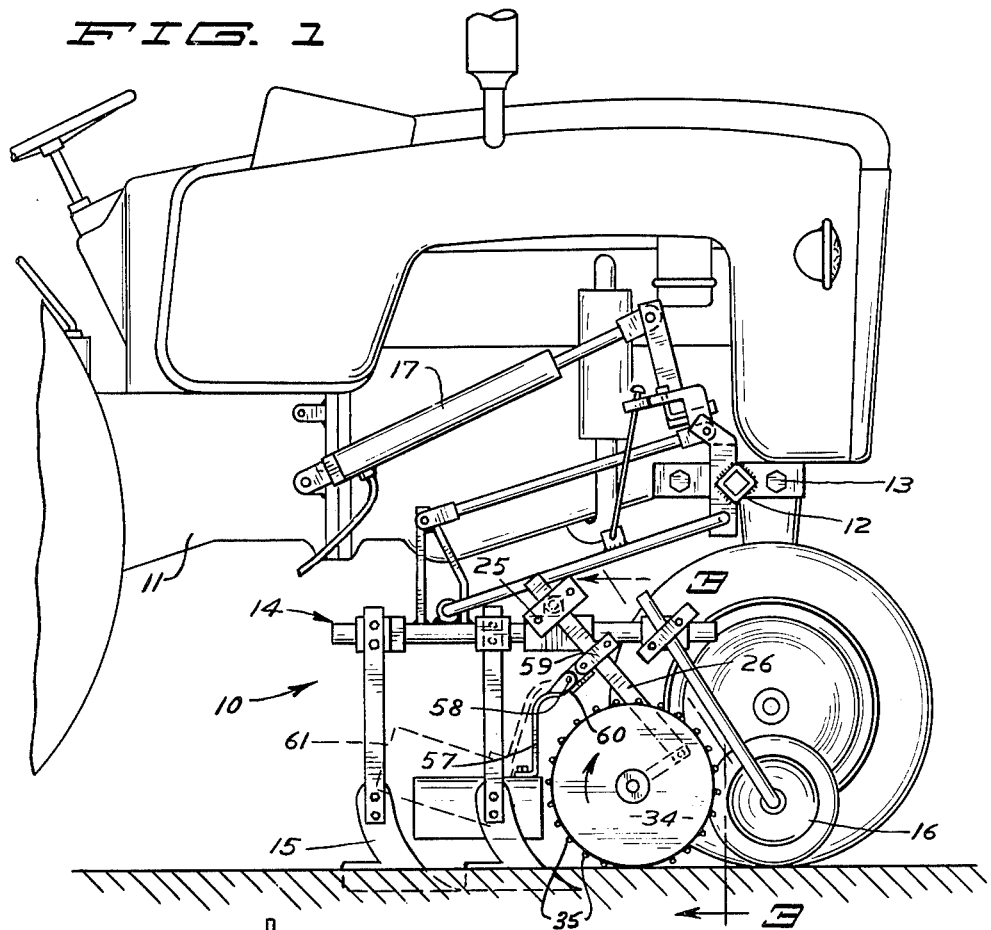
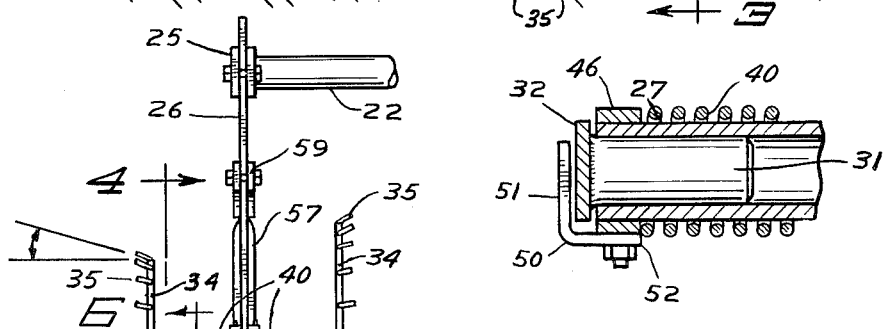
INVENTOR.
WALDO G. ERICKSON
BY
Dugger Braddock Johnson & Westman
ATTORNEYS April 26, 1966   W. G. ERICKSON   3,247,911
ROTATING CULTIVATOR SHIELD
Filed April 27, 1964   2 Sheets-Sheet 2
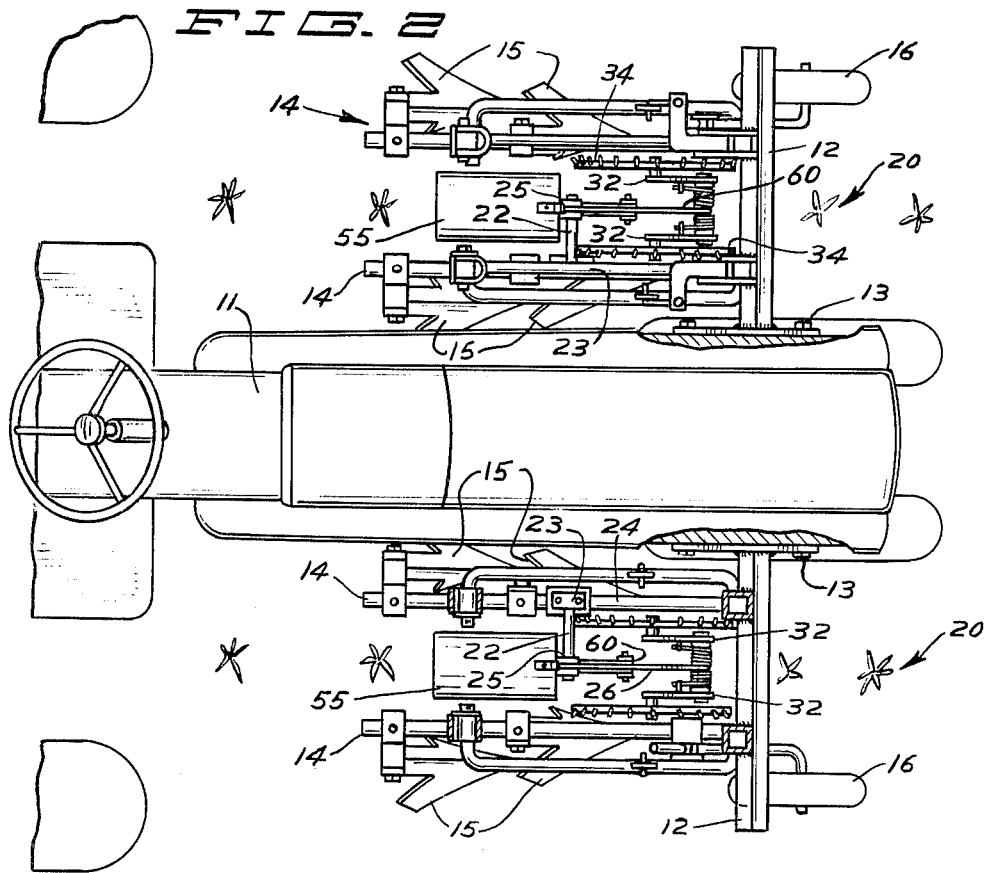
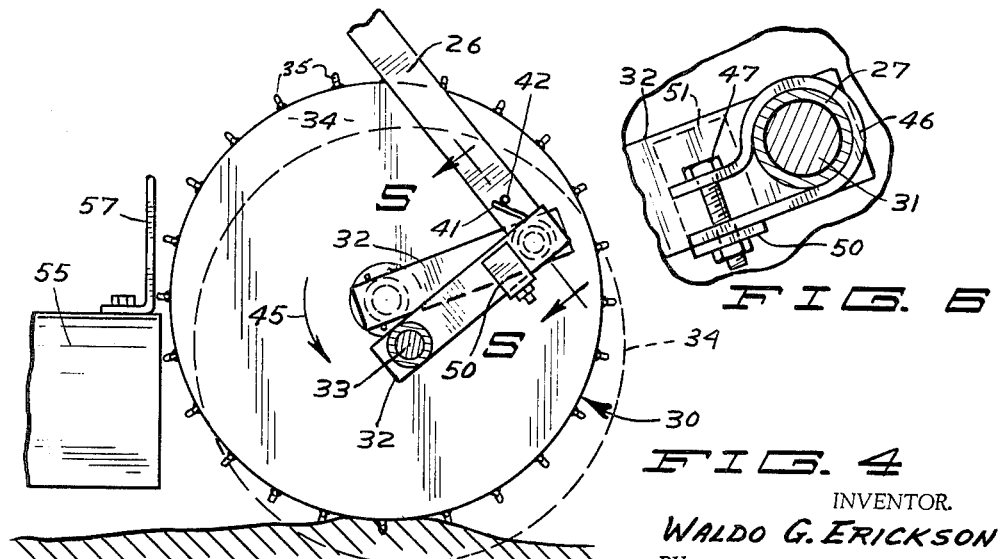
INVENTOR.
WALDO G. ERICKSON
BY
Dugger Broddock Johnson & Westman
ATTORNEYS

United States Patent Office 3,247,911
Patented Apr. 26, 1966

3,247,911
ROTATING CULTIVATOR SHIELD
Waldo G. Erickson, Rte. 2, Box 166, Springfield, Minn.
Filed Apr. 27, 1964, Ser. No. 362,782
5 Claims. (Cl. 172—510)

The present invention has relation to cultivator shields and more particularly to a rotating-type cultivator shield which has small projections or fingers on the outer periphery thereof in order to protect the plants being cultivated from trash and regulate the amount of dirt coming onto the row during the cultivation period.

While many different cultivator shields have been advanced for use on tractor mounting cultivators, the most widely used shield is merely a piece of sheet metal positioned on each side of the row and which is spaced slightly above the surface being cultivated to protect a row of young plants from being covered completely by the dirt. This type of shield presents many problems, particularly where there is a good deal of trash on the field. Long stalks that are encountered by the shield can be carried transversely to the row and completely destroy a considerable number of plants before they are either noticed by the operator and released, or become dislodged by themselves. Also, the degree of protection given by the conventional shield is not as great as is necessary in some cases and if the shields are set close to the ground they will continually become plugged up and drag material along with them.

The device of the present invention, on the other hand, as shown, presents a rotating cultivator shield which can be adjusted so that it contacts and moves along the ground as the cultivator moves forwardly. A separate shield is mounted on each side of the row being cultivated and is positioned to intercept the dirt thrown by the cultivator shovels toward the row and allow only a proper amount of dirt to move into and toward the row. The two disks comprising the shields for each row are independently spring-loaded so that they will go up over solid obstructions as the cultivator moves forwardly and also will "float" with the irregularities of the ground.

The rotating shields have fingers on the outer periphery thereof which extend at a slight angle with respect to the rotational axis of the shield. The fingers increase driving traction for the rotating disks and also insure that long trash, such as corn stalks, will be moved to position parallel to the row being cultivated and thereby will slip through the cultivator shovels without being dragged and causing uprooting of the plants.

An auxiliary overhead shield is also provided to protect the plants being cultivated from being covered by an excessive amount of dirt.

It is an object of the present invention to present a rotating-type cultivator shield which insures uniform protection for the cultivated plants and which has a plurality of fingers on the periphery thereof to insure proper handling of trash in the field.

In the drawings,

FIG. 1 is a side elevational view of a tractor-mounted cultivator having a rotating cultivator shield made according to the present invention installed thereon;

FIG. 2 is a top plan view of the device of FIG. 1;

FIG. 3 is a fragmentary enlarged front elevational view taken as on line 3—3 in FIG. 1;

FIG. 4 is a section view taken as on line 4—4 in FIG. 3;

FIG. 5 is a fragmentary enlarged sectional view taken as on line 5—5 in FIG. 4; and FIG. 6 is a fragmentary enlarged sectional view taken as on line 6—6 in FIG. 3.

Referring to the drawings and the numerals of reference thereon, a cultivator assembly illustrated generally at 10 is mounted onto a forward portion of a tractor 11 of conventional design. The cultivator, as shown, is also of a conventional design and can assume any preferred embodiment.

As shown, the cultivator has a main frame 12 that is mounted to the tractor with suitable fastening members 13. The main frame members 12 extend laterally outwardly from the sides of the tractor. Gangs 14 of cultivator shovels 15 are mounted so that they are positioned in spaced apart relationship on the frame 12. The spaces between gangs are to permit a row of plants to pass between the gangs while weeds are removed adjacent the rows and between the rows. An outer gauge wheel 16 is mounted to the outer gangs. A hydraulic cylinder 17 can be utilized through existing operator controls on the tractor 11 for raising and lowering the cultivator in a usual manner. While one particular form of cultivator is shown, it is to be understood that the shields can be mounted on any existing cultivator.

When cultivating rows of corn, as illustrated at 20, or other row crops, the points of the shovels 15 will be beneath the surface of the ground, as shown in FIG. 1, and will throw dirt from each side of the row inwardly toward the row. In certain instances too much dirt will be thrown toward the rows of plants and can cover or damage the corn plants in the rows 20. Also stalks of trash, such as old corn stalks, can become lodged on the shovels and carried transversely to the row by the shovels. Many times the corn stalks will be carried by one shovel on one gang and a shovel on the gang on the opposite side of the row. This is very damaging and causes the uprooting of the plants in the row.

In order to control the flow of soil or dirt onto the row 20 and also to control the amount of trash contacting the row 20, a pair of cultivator shields for each row, as illustrated generally at 21, has been advanced.

A bracket 22 comprising a shaft-like member is clamped with a suitable first clamp 23 to a frame member 24 of each of the inner gangs of cultivators. The bracket 22 extends transversely to each of the rows 20 and toward the rows from the inner gangs of cultivator shovels.

The brackets 22 terminate substantially vertically aligned with the rows 20 or, in other words, half-way between the adjacent gangs on each side of the tractor. The outer ends of the brackets 22 include second clamp members 25 each of which releasably and adjustably holds a bar 26. The bars 26 extend downwardly and forwardly from the clamp members.

A separate pair of tubular mounting hubs 27, 27 are mounted to the outer end of each of the bars 26. Each of the hubs 27 in a pair extends co-axially with the other and extends outwardly from one side of the bar member 26. The axes of the hubs 27 are transverse to the rows 20. The axis is also substantially horizontal.

A separate rotating cultivator shield assembly 30 is mounted in each of the hub members 27. The assembly 30 includes a stub shaft 31 which is rotatably mounted within its corresponding hub member 27. An arm 32 is welded or otherwise fixedly secured to the outer end of the stub shaft 31 and extends rearwardly and downwardly.

A separate axle 33 is bolted to the end of the arms 32 opposite stub shaft 31. The axles 33 extend substantially parallel to the stub shafts 31 but are positioned so that they extend in opposite directions from the arms. In other words, the stub shafts 31 are positioned in the hubs 27 and extend toward the row 20 from the arms. The axles 33 extend away from the row 20.

A separate disk-like rotating shield member 34 is rotatably mounted onto each of the axles 33 in any usual or preferred manner. Suitable bushings or bearing may be provided and also suitable means for retaining the shield members 34 on the axles is also provided. Rotating shield members 34 rotate in the plane at substantially right angles to the axis of rotation. A plurality of short fingers 35 are welded to the outer edges of each of the disk-like members 34 at regularly spaced intervals. Fingers 35 are set at a predetermined angle with respect to the axes of rotation of the disk-like members and extend away from the row 20 with which the disk-like member is associated. The fingers extend outwardly in direction away from the row at an angle of 15 to 20 degrees with respect to the axis of rotation of their disk. The fingers are of sufficient length to extend beyond the side surfaces of the disk a short distance, for example, ⅜ to ½ inch.

A separate torsion spring 40 is mounted over each of the hubs 27. One end portion 41 of each of the torsion springs 40 is positioned under a stop 42 on its associated bar 26 and the other end member 43 of each torsion spring is positioned to engage a stop 44 on its associated arm 32. The torsion springs are positioned so that they will exert a resilient force on the arm downwardly about the axis of shafts 31, in direction as indicated by arrow 45.

In order to keep the shafts 31 in position within the respective hubs 27, a clamp assembly 46 is mounted to each of the hubs 27 at the outer portions thereof adjacent the outer end of the torsion springs.

The clamps 46 are held in place around the hub 27 with bolts 47. Each of the bolts 47 mounts a separate angle bracket 50. Each angle bracket 50 has an upright leg 51 which extends outwardly from the clamps 46 and is positioned on the outside of its associated arm 32. The upright leg 51 prevents the shaft 31 from moving axially outwardly out of the hub 27 and yet permits the arm to move upwardy and downwardly about the pivot of shaft 31. A laterally extending base leg 52 of each of the brackets 50 comprises a stop member for its associated arm 32, the legs 52 are substantially parallel to the axis of hubs 27. The arms 32 are free to move upwardly against the action of their associated torsion springs 40. When the cultivator gangs are raised, the brackets holding the shields will raise. The legs 52 will also raise the arms 32.

As the cultivator is moved along the rows, and is cultivating the portion between the rows, the outer peripheral portions of the shield 34 will contact the ground. The fingers 35 will aid in rotating the shields as they move along the ground. Any dirt thrown up by the cultivator shovels adjacent the rows will engage the adjacent shield and will be moved deflected rearwardly so that it will not directly contact the small plants and cover them. Large stalks will be engaged by the finger portion 35 and moved so that they are parallel to the row before being discharged. This will prevent long stalks from being carried between the inner and outer gangs of shovels and dragged longitudinally along the rows 20 being cultivated.

The rotating action of the shield and the lifting action of the fingers will cause the stalk to pivot about the shank or cultivator shovel which is dragging the stalk along and lifted upwardly and moved parallel to the row. The inclined fingers impart a much better action for cleaning the trash then radial finger or fingers extending parallel to the axis of rotation of the shield. The stalks are not spread and the type or angle of the finger lets material slide off more easily.

In exceptionally trashy conditions an auxiliary shield 55 can be utilized. The auxiliary shield 55 is a U-shaped member having a top panel 56 which is attached to a bracket 57 which in turn is pivotally mounted as at 58 to a bracket 59 that is attached to the bar 26. A separate U-shaped member 55 is mounted in each of the rows being cultivated. A stop bracket 60 is provided to prevent the shield from rotating about pivot 58 too far downwardly.

The shield is held in position as shown in FIG. 1 in normal use. It will pivot upwardly to position as shown in dotted lines at 61 if an obstruction is encountered.

The auxiliary shield protects the plants in each of the rows when especially extra trashy conditions are encountered. The trash will strike the auxiliary shield and not cover the plants after being discharged rearwardly from the rotating shields 34. Also, if desired, a shield can be placed close to the ground where small plants are located to protect them from dirt being thrown toward the row and thus will permit more dirt to be moved toward the row without covering the plants, if desired.

The shields are fully adjustable in position by adjusting the position of bars 26 in bracket members 25. Moving the bars upwardly will also move the hubs upwardly and rearwardly. The clamps 46 are adjusted so that the arm 32 can rotate until the shield contacts the ground. The shield will be moved further rearwardly with respect to the adjacent shovels 62 and will intercept more of the dirt flowing toward the row and prevent excessive dirt from covering the plants in the row.

The shields can be raised or lowered as desired or as necessary. The shields protect the plants from rocks, debris and other trash.

The long stalks that would normally lodge transverse to the rows are carried upwardly at the rear of the shields because of the rotation and the flow of dirt carries the base of stalks toward the row until the stalks is ejected parallel to the row.

What is claimed is:

1. A cultivator shield for row crop cultivators having cultivated shovels mounted on opposite sides of a row to be cultivated and positioned to enter the ground and move dirt toward the row, said cultivator shield comprising a mounting member mounted on said cultivator, a bracket member extending downwardly and forwardly from said mounting member, a hub mounted to the lower end of said bracket member, separate cultivator shields support arms pivotally mounted in opposite ends of said hub, said support arms extending rearwardly and downwardly from said hub, resilient means urging said arms in downward direction, a separate disc-like cultivator shield rotatably mounted to the lower rearward end of each of said arms, with the axes of said shields substantially parallel to the ground, said cultivator shield being positioned on opposite sides of the row of plants to be cultivated and positioned between the row and next adjacent cultivator shovels, said cultivator shields being adapted to engage the ground over which the cultivator is working and intercept dirt flowing from the adjacent cultivator shovels toward the row, and a plurality of finger like projections fixed to the outer peripheral edge of each of said cultivator shields, said finger like projections extending beyond the cultivator shields in direction away from the row, the longitudinal axis of each of said finger like projections being positioned at an angle of substantially 20° to the axis of rotation of said cultivator shields.

2. The combination as specified in claim 1 wherein said bracket member is adjustable along its longitudinal axis.

3. The combination as specified in claim 2 and stop means for each of said arms to limit the downward movement of said arms.

4. The combination as specified in claim 3 wherein each of said arms have a stub shaft welded thereto, and said stub shafts are rotatably mounted in said hubs for mounting said arms, and bracket means for preventing said stub shafts for moving axially out of said hubs in normal working position of said cultivator shields, said arms being movable to a position wherein they clear said bracket means and said stub shafts can be moved axially out of said hubs.

5. The combination as specified in claim 4 wherein said resilient means comprises a torsion spring mounted over each of said hubs and is adapted to urge said arms downwardly against said stop means.

References Cited by the Examiner

UNITED STATES PATENTS

| | | | |
|---|---|---|---|
| 887,078 | 5/1908 | Estes et al. | 172—510 |
| 2,116,161 | 5/1938 | Shanks | 172—513 |
| 2,329,794 | 9/1943 | Speck | 172—177 |
| 2,718,185 | 9/1955 | Shawd | 172—510 |
| 2,720,148 | 10/1955 | Proefrock | 172—513 X |
| 3,151,431 | 10/1964 | Daugherty | 172—517 X |

FOREIGN PATENTS 496,538  10/1921  France.

ABRAHAM G. STONE, *Primary Examiner.*

T. GRAHAM CRAVER, *Examiner.*

J. R. OAKS, *Assistant Examiner.*